United States Patent [19]

Hickey

[11] Patent Number: 5,386,146
[45] Date of Patent: Jan. 31, 1995

[54] IN-LINE AUGER DRIVEN CHARGING SYSTEM

[76] Inventor: John J. Hickey, 27 Bowdoin St., Apt. 4A, Boston, Mass. 02114

[21] Appl. No.: 236,993

[22] Filed: May 2, 1994

Related U.S. Application Data

[63] Continuation-in-part of Ser. No. 52,123, Apr. 22, 1993.

[51] Int. Cl.$^6$ .................. B60K 8/00; F03D 9/00; F03B 11/00
[52] U.S. Cl. .................. 290/55; 180/2.2; 290/1 R; 290/44; 290/45; 415/401; 415/4.3; 415/905; 416/55; 416/223 R; 416/DIG. 4
[58] Field of Search .................. 180/2.2; 290/1 R, 44, 290/45, 55; 415/4.1, 4.3, 905; 416/55, 223 R, DIG. 4

[56] References Cited

U.S. PATENT DOCUMENTS

| | | | |
|---|---|---|---|
| 1,903,307 | 4/1933 | Gillio | 290/55 |
| 1,903,823 | 4/1933 | Lougheed | 415/914 |
| 2,941,613 | 6/1960 | DiPerna | 290/44 |
| 3,556,239 | 1/1971 | Spahn | 290/55 |
| 3,638,369 | 2/1972 | Albrecht | 52/16 |
| 3,740,565 | 6/1973 | Wesley | 290/55 |
| 3,878,913 | 4/1975 | Lionts et al. | 290/44 |
| 3,963,112 | 6/1976 | Crego | 198/671 |
| 4,254,843 | 3/1981 | Han et al. | 290/55 |
| 4,443,708 | 4/1984 | Lapeyre | 290/53 |
| 4,589,344 | 5/1986 | Davison | 290/55 |
| 4,606,697 | 8/1986 | Appel | 415/4.4 |
| 4,974,633 | 12/1990 | Hickey | 415/914 |

FOREIGN PATENT DOCUMENTS 55-69765  5/1980  Japan .................. 415/4.2

OTHER PUBLICATIONS

Eldridge, Wind Machines, 1980, pp. 118–121.

Primary Examiner—A. D. Pellinen
Assistant Examiner—Robert Lloyd Hoover
Attorney, Agent, or Firm—Daniel J. Bourque; Michael J. Bujold; Anthony G. M. Davis

[57] ABSTRACT

An in-line fluid medium driven charging system includes a fluid medium driven generator disposed in a fluid medium directing tube. The fluid medium driven generator includes an auger shaped, fluid medium engaging member and is coupled to an electrical generator. Rotation of the auger shaped, fluid medium engaging member by intercepting a flow of a fluid medium causes rotation of the electrical generator, thereby generating electrical energy which recharges and assists in maintaining the life of a battery in a moving vehicle.

9 Claims, 6 Drawing Sheets

IN-LINE AUGER DRIVEN CHARGING SYSTEM

RELATED APPLICATIONS

This Application is a continuation-in-part of U.S. patent application Ser. No. 08/052,123, U.S. Pat. No. 5,313,103, entitled AUGER SHAPED FLUID MEDIUM ENGAGING MEMBER and filed Apr. 22, 1993 which is fully incorporated herein by reference.

FIELD OF THE INVENTION

This invention relates to electrical generators and more particularly, to an auger shaped, fluid medium engaging member for a wind and water powered electrical generator system.

BACKGROUND OF THE INVENTION

Although fossil fuels are in ample supply as a resource and although oil technology exists for sea floor drilling to a depth of two miles, extracting and transporting fossil fuels is akin to playing Russian roulette. For example, strip mining, deep shaft mining, acid rain and oil spills all scar and pollute the earth's surface. Accordingly, more and more people are realizing that dependance upon fossil fuels for generating electricity should be minimized and ideally reduced.

As fossil fuels become more scarce, expensive and unavailable for a variety of reasons, more and more people are realizing that dependance upon fossil fuels for generation of electricity should be minimized and ideally reduced.

Apart from nuclear generated electricity, much interest exists in generating electricity utilizing renewable resources, such as wind and water power. Most traditional attempts at harnessing the wind to generate electricity include the use of windmills. Although traditional windmills have proved somewhat satisfactory, their use is limited to areas in which a reasonable amount of wind blows, such as mountain tops and western plains. These areas are often remote from civilization to accommodate the size of the windmills and their supporting superstructures. Additionally, windmills are typically noisy and aesthetically unappealing.

There are, however, many instances and locations in which particularly air flow and also water flow, could be harnessed to generate electricity if the proper generating apparatus were available. For example, airplanes in flight, moving trains, cars, trucks and buses all generate wind flow passed their structures. In addition, a considerable amount of wind is generally always present on and about high rise buildings. In all these cases, if a low profile, horizontally disposed wind generating apparatus could be provided, a substantial amount of electrical energy could be generated, enough perhaps to make the attached object more energy self-sufficient.

In conjunction with wind and solar power which will definitely contribute to an ever increasing lessened dependency on fossil fuels, it is hoped that hydrogen fusion and perhaps even cold fusion will serve as alternative sources of energy. The use of these alternative sources of energy will be a many fold benefit to the planet.

The need to reduce our reliance on fossil fuels is finally being recognized with the advent of electrically-powered automobiles. The new generation of electric cars, which will comprise two percent of the vehicles sold by 1998, utilize conventional 12 volt batteries for power. Although these electric cars reduce our dependence on fossil fuels, they are presently capable of only very limited ranges due to the rapid drain of power on their batteries, and thus require continual recharging.

Research efforts are being made to develop better batteries which will last longer between charges, although still requiring recharging, as well as providing electricity pumps which would be easily accessible, similar to existing gas stations. However, electricity pumps would create large daytime drains on public electric utilities when demand for electricity is already high.

Accordingly, what is needed is an auger shaped, fluid medium engaging member for an electrical generator apparatus which can generate sufficient quantities of electricity and which can be housed in a reasonably compact enclosure, to enable the apparatus to be mounted in mobile installations, such as airplanes, trains, trucks, buses and cars, masts and upper super structures of power or sail vessels, as well as in more compact areas in which a traditional windmill won't fit, such as between floors or on top of roofs of a high rise building or in a motor vehicle.

Such an auger shaped, fluid medium engaging member allows for an in-line, auger driven charging system for utilizing the wind flows created by the movement of vehicles such as cars, trucks, and even boats, to replenish electricity drains on the vehicle's battery as the vehicle is in motion, thereby reducing the need for continual recharging and extending the vehicle's battery life.

SUMMARY OF THE INVENTION

This invention features an in-line auger driven charging system for charging a battery in a moving vehicle, and includes a fluid medium flow inlet, an auger driven electrical generator, and a fluid medium flow outlet.

The auger driven electrical generator, coupled to the battery of the moving vehicle includes an auger shaped, fluid medium engaging member disposed in a fluid medium directing tube, and an electrical generator. The fluid medium engaging member is adapted for intercepting the flow of a fluid medium, such as air or water, for effecting rotational movement of the fluid medium engaging member, thereby effecting rotational movement of the electrical generator.

The in-line auger driven charging system includes a fluid medium flow inlet located proximate a front or forward facing surface of the moving vehicle for receiving the flow of the fluid medium.

Additionally, the system includes a fluid medium flow outlet, located proximate a bottom or rearwardly facing surface of the moving vehicle, for discharging the flow of fluid medium from the fluid medium directing tube.

The auger shaped, fluid medium engaging member includes a helically shaped, outer region disposed about a longitudinal axis which passes through the central region of the fluid medium engaging member. The helically shaped outer region establishes at least one helically shaped fluid medium engaging surface. The auger shaped, fluid medium engaging member is adapted for rotational movement about its longitudinal axis which is effected by a flow of a fluid medium striking the helically shaped fluid medium engaging surface.

In the preferred embodiment, the auger shaped, fluid medium engaging member is coupled to an electrical generator, for generating electrical energy upon rotation of the electrical generator caused by the fluid medium striking the fluid medium engaging surface of the auger shaped, fluid medium engaging member. Further, the flow of fluid medium originates from a direction parallel to the longitudinal axis of the fluid medium engaging member.

The preferred embodiment further includes a plurality of surface deviations on the helically shaped, fluid medium engaging surface, for enhancing rotational movement or rotational effects of the fluid medium striking the helically shaped, fluid medium engaging surface. The plurality of surface deviations may be in the form of a wedge or semi-conical deviation, or a concave deviation. Further, the deviations may be arranged in a plurality of deviation sets which extend radially from a central point such as a central deviation.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
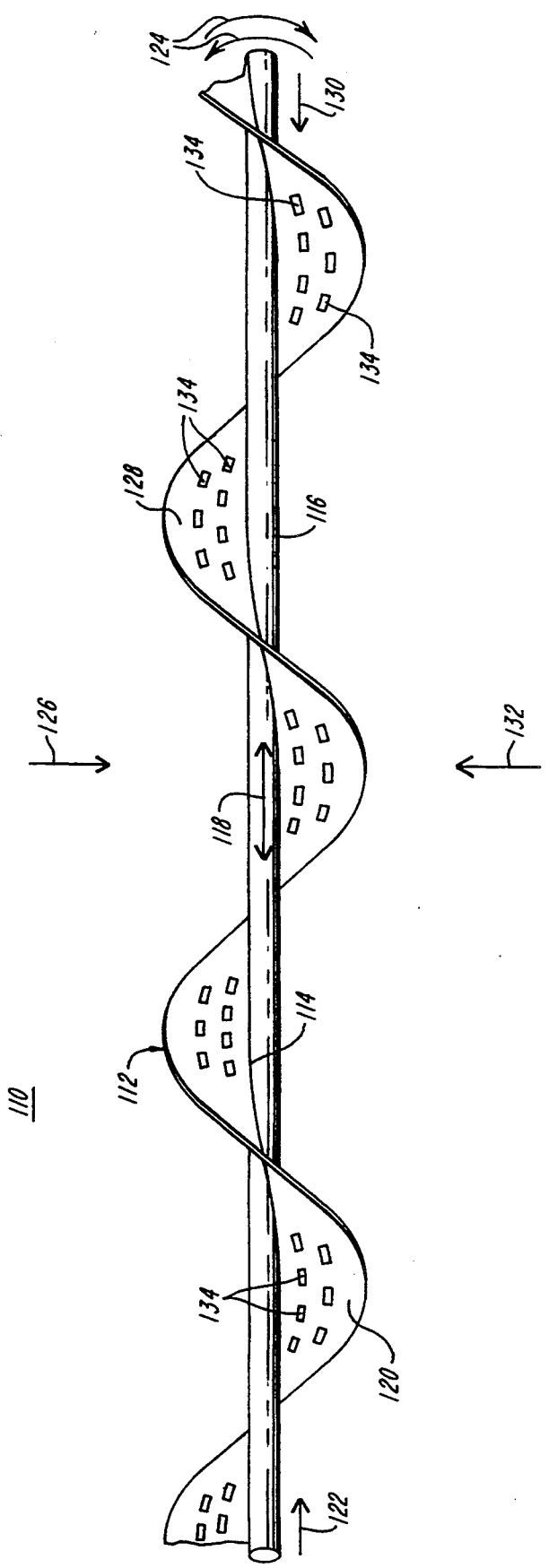
FIG. 1 is a perspective view of the auger shaped fluid medium engaging member of the present invention.

The auger shaped, fluid medium engaging member 10, FIG. 1, according to the present invention includes a helically formed outer region 12 and a central region 14 which are wrapped or formed about a longitudinal core region 16 having a longitudinal axis indicated generally by arrow 18, parallel to the core region 16.

The helically shaped outer region 12 establishes at least one helically shaped fluid medium engaging surface 20 about the length of the fluid medium engaging member 10. A fluid medium, such as air or water, which originates from a direction indicated generally by arrow 22, will be intercepted by the fluid medium engaging surface 20 and will cause the auger shaped, fluid medium engaging member 10 to rotate about the longitudinal axis 18 as shown generally by arrows 24. Additionally, a fluid medium striking the at least one fluid medium engaging surface 20 from a direction indicated generally by arrow 26 will also impart the same rotational movement on the auger shaped, fluid medium engaging member 10.

In another embodiment, the auger shaped, fluid medium engaging member may include a second fluid medium engaging surface 28 which will intercept the flow of a fluid medium from the directions indicated generally by arrows 30 and 32 to cause the auger shaped, fluid medium engaging member 10 to rotate as indicated by arrows 24.

In order to facilitate and enhance the effects of a fluid medium such as air or water upon the auger shaped, fluid medium engaging member 10, and to thus impart more rotational movement on the auger shaped fluid medium engaging member, the first or second fluid medium engaging surfaces 20, 28 may include a plurality of surface deviations 34.

Figure 2:
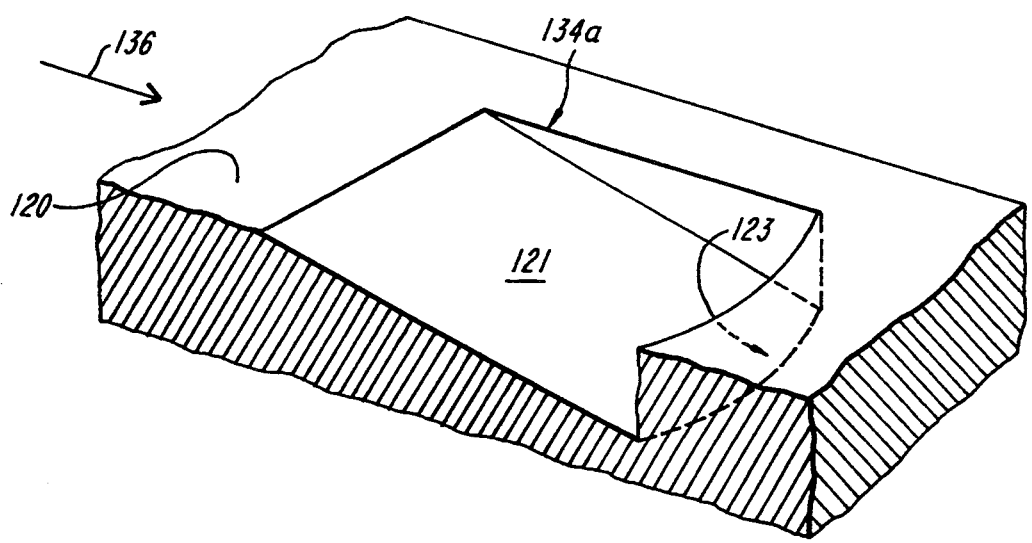
FIG. 2 is a perspective view of a first embodiment of a surface deviation on the fluid medium engaging surface of the auger shaped fluid medium engaging member of the present invention.
Figure 3:
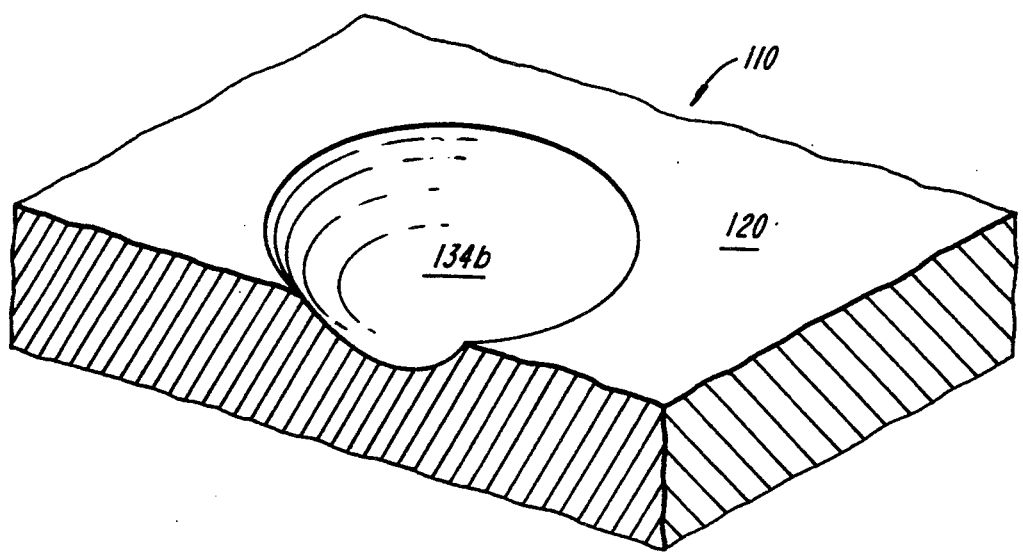
FIG. 3 is a perspective view of a second embodiment of a surface deviation on the fluid medium engaging surface of the fluid medium engaging member of the present invention.

As shown in greater detail in FIG. 2, one embodiment of the fluid medium engaging surface deviations 34 includes a "wedge" or semi-conically shaped deviation 34a which greatly enhances the effects of a fluid medium striking the fluid medium engaging surface from the direction indicated generally by arrow 36.

In an alternative embodiment, the fluid medium engaging surface 20 may include a generally circular, concave deviation 34b. This circular shaped surface deviation also greatly enhances the effects of a fluid medium striking or contacting the fluid medium engaging surface 20 of the auger shaped fluid medium engaging member 10. In contrast, however, to the semi-conically or wedged shaped surface deviation 34a previously described, the concave, generally circular shaped surface deviation 34b is more unidirectional in its ability to intercept the flow of a fluid medium from generally any direction, to thereby enhance the effects of the fluid medium on the auger shaped, fluid medium engaging member 10.

Figure 4:
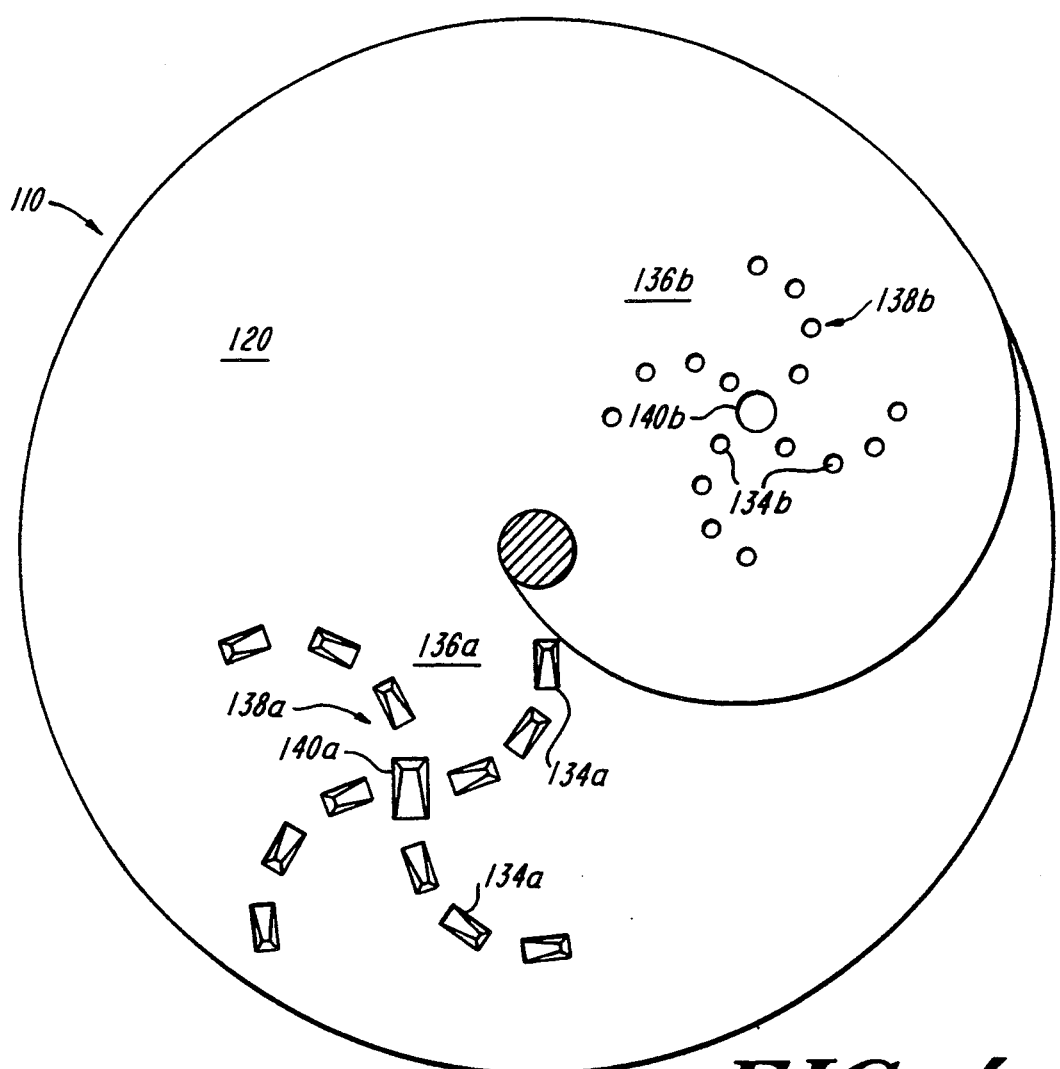
FIG. 4 is an end view of the fluid medium engaging member of the present invention illustrating the surface deviations according to the first and second embodiments illustrated in FIGS. 2 and 3 arranged in a surface deviation pattern on the fluid medium engaging surface of the auger shaped fluid medium engaging member.

In yet another embodiment, illustrated in FIG. 4, a plurality of surface deviations 34a, 34b may be grouped into one or more surface deviation patterns 36a, 36b. These patterns may be spirally formed, including one or more deviation sets, such as deviation sets 38a, 38b, each comprising a number of surface deviations 34a, 34b. The deviation sets 38a, 38b typically radiate outwardly, from a common central deviation 40a, 40b. Additionally, the deviation sets may be straight, or curvilinear, when extending from the common central deviation. Additional details of such surface deviations and surface deviation sets may be found in Applicant U.S. Pat. Nos. 4,872,484; 4,974,633 and 5,075,564 incorporated herein by reference.

Figure 5:
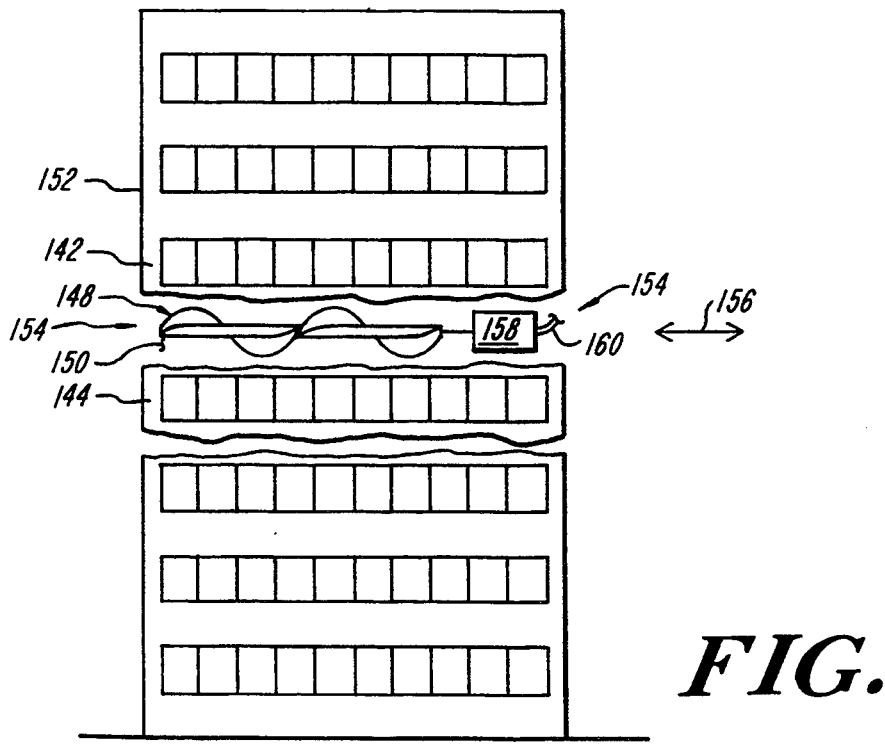
FIG. 5 is a perspective view of a high rise building, including a cut out region illustrating the electrical generator system with auger shaped fluid medium engaging member according to yet another embodiment of the present invention, mounted in a horizontal position between floors of the high rise building.

The ability to utilize the auger shaped, fluid medium engaging member of the present invention in conjunction with an electrical generator, to form an electrical energy generating system having an auger shaped, fluid medium engaging member, allows such an electrical generating system to operate when oriented horizontally, in a closed area, such as in the space between floors 42, 44, FIG. 5. In this embodiment, the horizontally oriented electrical generating system with auger shaped, fluid medium engaging member 48, is disposed in the space 50 between floors 42 and 44. The exterior of the building 52 is provided with one or more openings 54 which allows wind to enter the region 50 between floors 42 and 44 from either direction indicated generally by arrow 56, parallel to the longitudinal axis of the auger shaped, fluid medium engaging member and electrical generating system 48.

In this embodiment, tall buildings such as skyscrapers which are nearly always buffeted by constant strong winds may take advantage of this free renewable energy source. The winds will cause the auger shaped, fluid medium engaging member to rotate about its longitudinal axis. This rotation will in turn rotate electrical generator 58 which will produce electrical energy which is then distributed throughout the building by a means of one or more cables 60.

Figure 6:
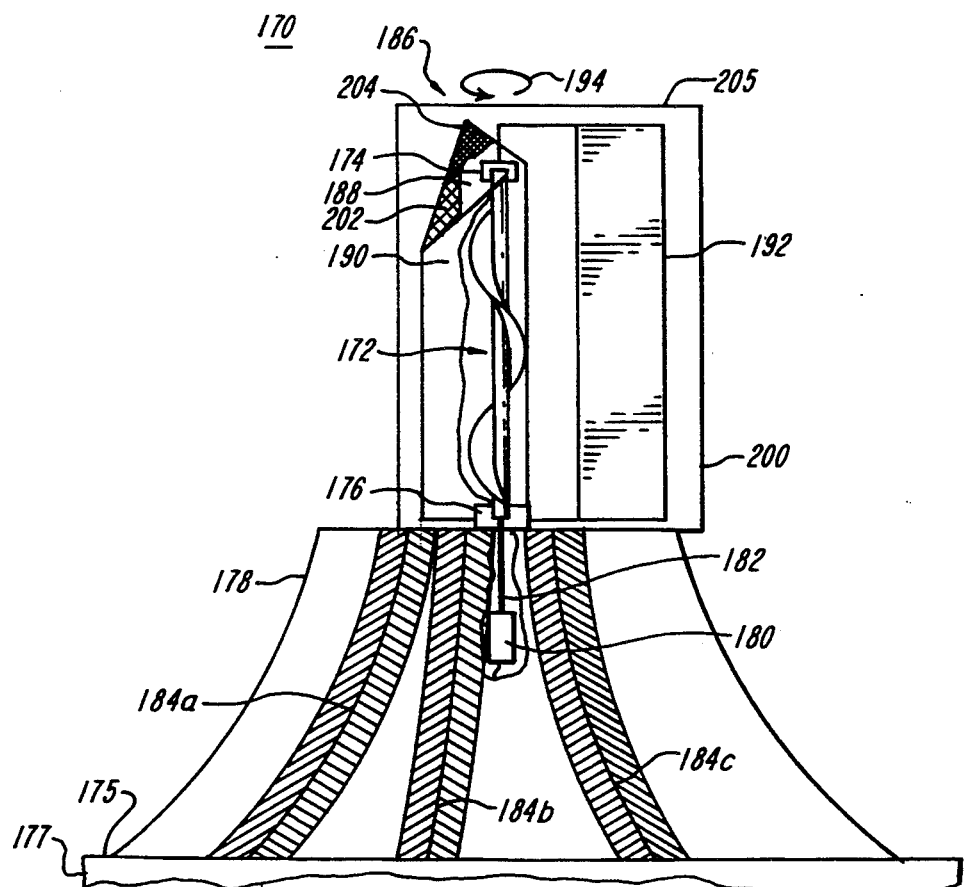
FIG. 6 is a perspective view of a vertically mounted electrical generator system including an auger shaped fluid medium engaging member according to a further embodiment of the present invention.

In yet another embodiment, the versatility of the auger shaped, fluid medium engaging member of the present invention in combination with an electrical generator is illustrated in a vertically mounted electrical generating system 70, FIG. 6. In this embodiment, the auger shaped, fluid medium engaging member 72 is mounted vertically, and adapted for rotational movement by means of first and second support members 74, 76 which include bearings or other similar means to allow the auger shaped, fluid medium engaging member 72 to rotate about its longitudinal axis.

The electrical generator system with auger shaped, fluid medium engaging member 70 is mounted on a pedestal 78 which in the preferred embodiment is approximately 8 to 12 feet tall. Inside the hill or pedestal 78 is disposed electrical generator apparatus 80 which is coupled to the auger shaped, fluid medium engaging member 72 by means of shaft or similar means 82. In this embodiment, the support pedestal 78 may also include several ridges 84a–84c, which serve to intercept the flow of air striking the hill or pedestal 78, and direct the air flow upwardly into the auger shaped, fluid medium engaging member 72.

The electrical generating system of this embodiment further includes a fluid medium funnel 86 comprised of first and second funnel members 88, 90. The first and second fluid medium funnel members are oriented at approximately a 90 degree angle, generally perpendicular to one another, to facilitate directing the air into the auger shaped, fluid medium engaging member 72.

An additional feature of this embodiment is a rudder 92, coupled to the system of the present invention. Rudder 92 serves to keep the fluid medium funnel 86, which is rotatable about the longitudinal axis of the auger shaped, fluid medium engaging member 72, pointed directly into the wind.

Figure 7:
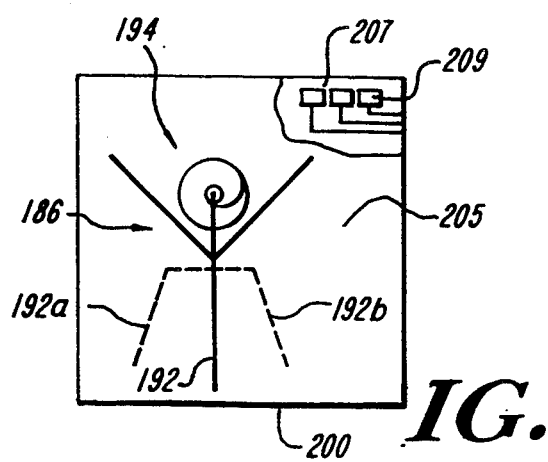
FIG. 7 is a top view of the vertically mounted auger shaped fluid medium engaging member and electrical generator system of FIG. 6.

In the alternative embodiment illustrated in FIG. 7, rudder 92 may instead take the form of a two piece straight or angled rudder including first and second rudder members 92a, 92b, coupled proximate a region opposite from the opening 94 of the fluid medium funnel 86.

Figure 8:
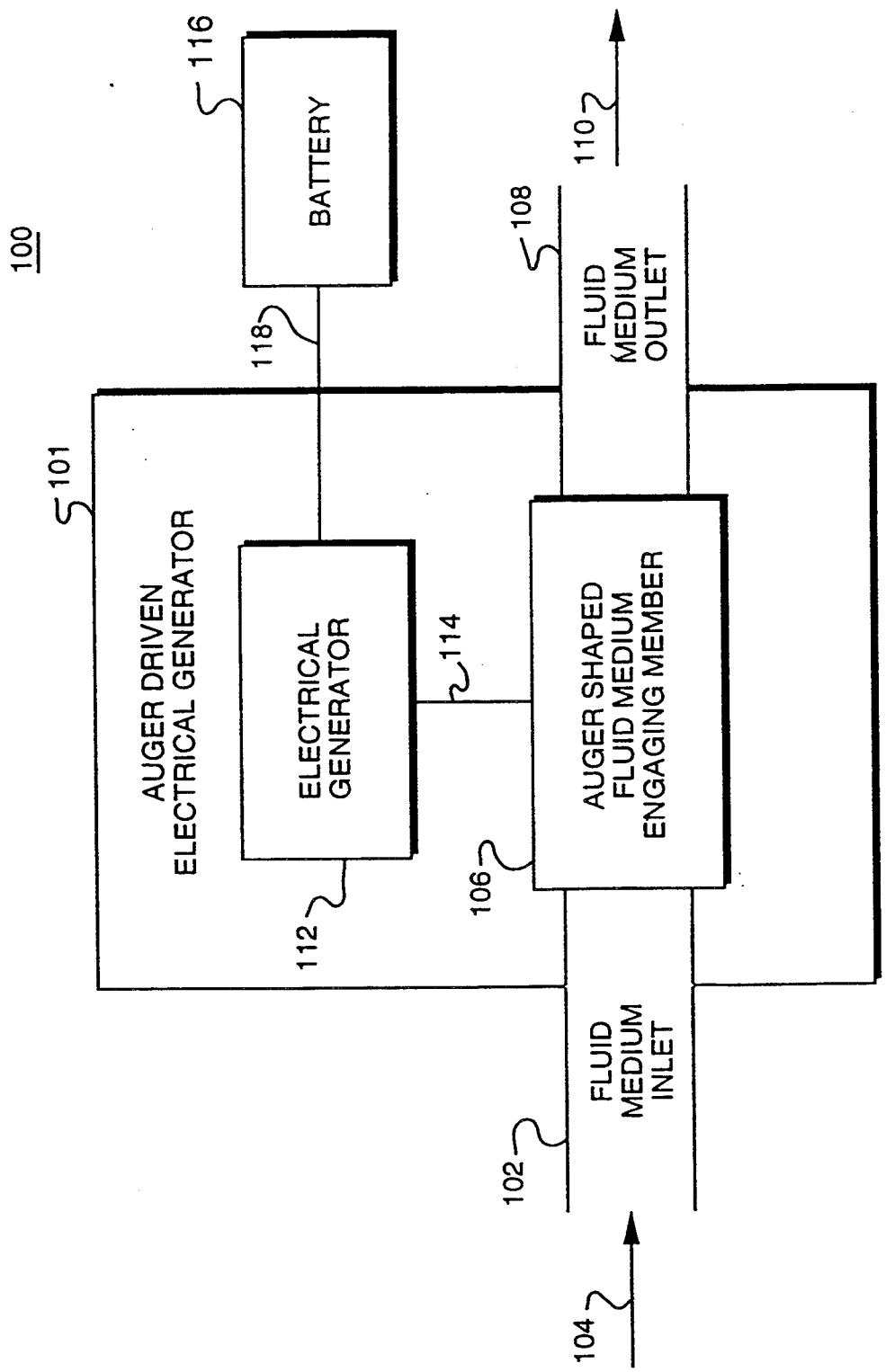
FIG. 8 is a block diagram of the in-line auger driven charging system in accordance with the present invention.

In another embodiment, an in-line auger driven charging system 100, FIG. 8, is shown for use in moving vehicles, such as electric and non-electric automobiles, trucks and boats. The in-line auger driven charging system comprises a fluid medium inlet 102, disposed proximate an auger driven electrical generator 101, for receiving a flow of a fluid medium, such as air or water, in direction 104. The flow of fluid medium transverses an auger shaped, fluid medium engaging member 106, included in auger driven electrical generator 101, prior to discharge through fluid medium outlet 108, in direction 110.

The auger shaped, fluid medium engaging member 106 is adapted for rotational movement effected by the flow of the fluid medium. Rotation of the auger shaped, fluid medium engaging member effects rotational movement by the electrical generator 112, also included in auger drive electrical generator 101, and coupled to the auger shaped, fluid medium engaging member 106 by means of a shaft 114 or similar means.

In response to the rotation of electrical generator 112, electrical energy is generated by electrical generator 112. The electrical energy is distributed to a battery 116 included in a moving vehicle, by means of electrical cable 118, for recharging the battery 114 upon movement of the vehicle. Those skilled in the art will recognize the large variety of moving vehicles in which the in-line auger driven charging system 100 of the present invention may be used.

Figure 9:
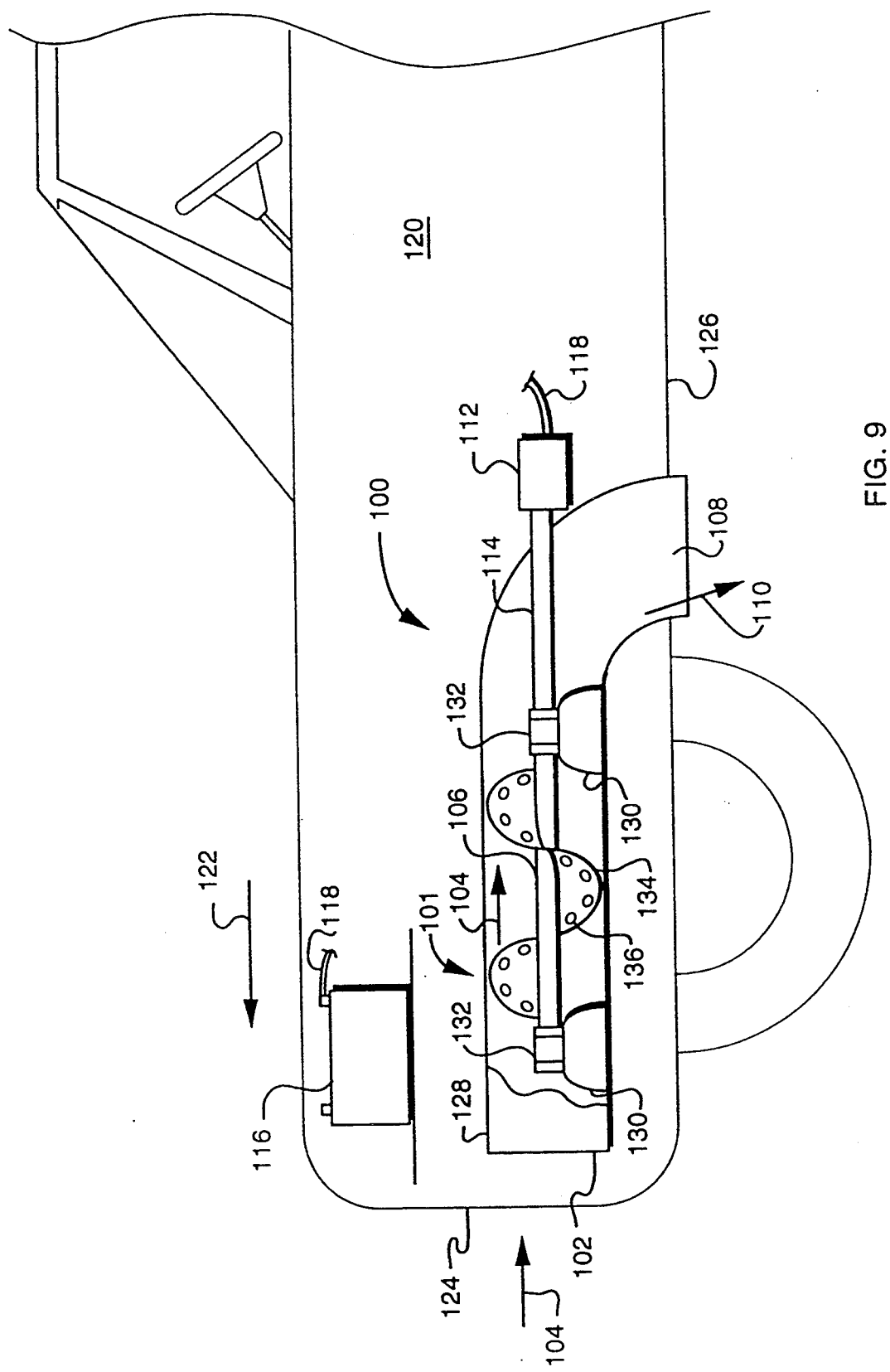
FIG. 9 is a perspective view of an electric car, including an in-line auger driven charging system, coupled to the battery of the electric car, for recharging the battery during operation of the car.

The preferred embodiment utilizing the in-line auger driven charging system 100, FIG. 9, shows the in-line auger driven charging system 100 mounted in an electric car 120. As the electric car 120 moves in direction 122, a flow of air passes through the fluid medium inlet 102 of the in-line auger driven charging system 100, in direction 104. The fluid medium inlet 102 is disposed proximate a front surface 124 of the electric car 120. The flow of air passes through the auger driven electrical generator 101 and is discharged through the fluid medium outlet 108, disposed proximate to a bottom surface 126 of the electric car 120.

As the flow of air passes through the auger driven electrical generator 101, the flow of air effects a rotational movement on the auger shaped, fluid medium engaging member 106 as the air flows in direction 104. The auger shaped, fluid medium engaging member 106 is disposed within fluid medium directing tube 128 and coupled to the electric car 120 by means of support brackets 130. Further, auger shaped, fluid medium engaging member 106 is adapted for rotational movement by means of bearings 132, coupled to support brackets 130.

In this embodiment, the flow of air transverses at least one helically shaped, fluid medium engaging surface 134 of the auger shaped, fluid medium engaging member 106 thereby providing rotational movement of the auger shaped, fluid medium engaging member 106. The helically shaped, fluid medium engaging surface 134 includes a plurality of surface deviations 136 for enhancing rotational movement or rotational effects of the flow of air striking the helically shaped, fluid medium engaging surface 134. The plurality of surface deviations may be in the form of a wedge or semi-conical deviation or a concave deviation and may be arranged in a plurality of deviation sets which extend radially from a central point such as a central deviation.

Rotation of the auger shaped, fluid medium engaging member 106 effects rotational movement of the electrical generator 112, also included in auger driven electrical generator 101, and coupled to the auger shaped, fluid medium engaging member 106 by means of a shaft 106 or similar means. Upon rotation of the electrical generator 112, the electrical generator 112 generates electrical energy which is distributed to a battery 116, located in electric car 120, by means of electrical cable 118, for recharging the battery 116 upon movement of electric car 120 in direction 122.

Modifications and substitutions by one of ordinary skill in the art are considered to be within the scope of the present invention which is not to be limited except by the claims which follow.

What is claimed is:

1. An in-line auger driven charging system for charging a battery in a moving vehicle, comprising:
    a fluid medium flow inlet, disposed proximate a front surface of said moving vehicle, for receiving a flow of a fluid medium and for directing said flow though a fluid medium directing tube;
    an auger driven electrical generator, coupled to said battery in said moving vehicle, said auger driven electrical generator including an auger shaped, fluid medium engaging member, said auger shaped, fluid medium engaging member disposed within said fluid medium directing tube and coupled to said electrical generator, said electrical generator adapted for providing a source of electrical energy to said battery,
    said auger shaped, fluid medium engaging member including a helically shaped outer region disposed about a longitudinal axis which passes through a central region of said auger shaped, fluid medium engaging member, said helically shaped outer region establishing at least one helically shaped, fluid medium engaging surface, said at least one helically shaped, fluid medium engaging surface including a plurality of surface deviations arranged in a plurality of deviation sets, for enhancing rotational movement of said auger shaped, fluid medium engaging member effected by said flow of fluid medium, said auger shaped, fluid medium engaging member adapted for rotational movement about said longitudinal axis, said flow of a fluid medium effecting said rotational movement of said auger shaped, fluid medium engaging member and said electrical generator upon striking said at least one helically shaped, fluid medium engaging surface; and
    a fluid medium flow outlet, disposed proximate a bottom surface of said moving vehicle for discharging said flow of a fluid medium from said fluid medium directing tube.

2. The system of claim 1, wherein said fluid medium originates from a direction parallel to said longitudinal axis, for effecting said rotational movement of said auger shaped, fluid medium engaging member.

3. The system of claim 1, ,wherein said plurality of deviation sets extend radially from a central point.

4. The system of claim 1, wherein said plurality of deviation sets are arranged in a curvilinear pattern and extend radially from a central deviation, forming a spiral pattern of said surface deviations.

5. The system of claim 1, wherein said deviations include concave deviations.

6. The system of claim 1, wherein said deviations include wedge shaped deviations.

7. The system of claim 1, wherein said fluid medium includes air.

8. The system of claim 1, wherein said fluid medium includes water.

9. An in-line wind driven charging system for charging a battery in a moving vehicle including an auger shaped fluid medium engaging member, disposed in a wind directing tube, for effecting rotational movement in an electrical generator by intercepting the flow of wind, comprising:
    a wind flow inlet, disposed proximate a front surface of said moving vehicle, for receiving a flow of wind and for directing said flow through a wind directing tube;
    an auger shaped, fluid medium engaging member, said auger shaped, fluid medium engaging member including a helically shaped outer region disposed about a longitudinal axis which passes through a central region of said auger shaped, fluid medium engaging member, said helically shaped outer region establishing at least one helically shaped fluid medium engaging surface, said auger shaped, fluid medium engaging member adapted for rotational movement about said longitudinal axis, said flow of wind effecting said rotational movement of said auger shaped, fluid medium engaging member upon striking said at least one helically shaped fluid medium engaging surface, for effecting rotational movement of said auger shaped, fluid medium engaging member and a coupled device, said at least one helically shaped fluid medium engaging surface including a plurality of surface deviations extending radially from a central point, said plurality of surface deviations including wedge shaped deviations;
    a wind flow outlet, disposed proximate a bottom surface of said moving vehicle, for discharging said flow of wind from said wind directing tube; and
    an electrical generator, coupled to said auger shaped fluid medium engaging member, for generating electrical energy upon rotation of said electrical generator effected by said rotational movement of said auger shaped fluid medium engaging member.

* * * * *